July 1, 1924. Re. 15,868
C. J. HAZELTON
HOSE SUPPORTER
Original Filed Feb. 24, 1922
Fig. 1,
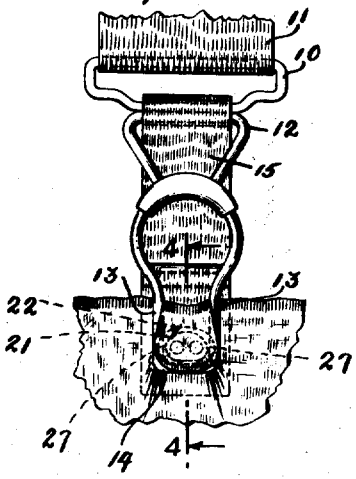
Fig. 2,
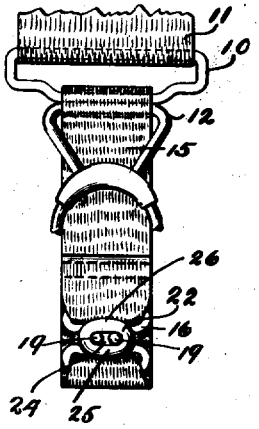
Fig. 3,
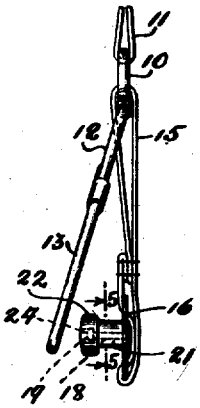
Fig. 4,
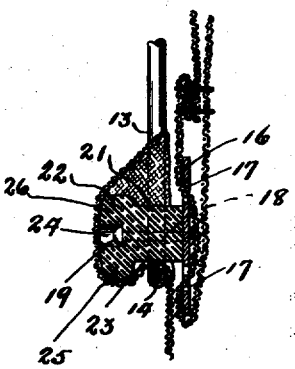
Fig. 5,
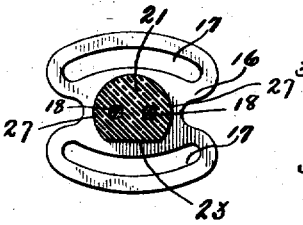
Fig. 7,
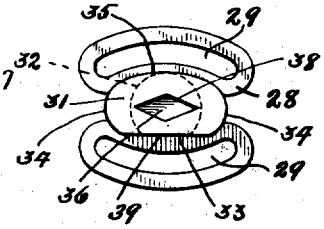
Fig. 6,
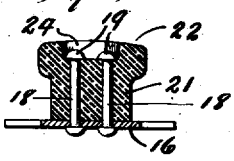
Fig. 8,
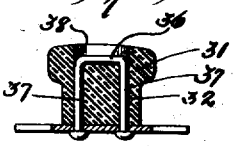
Fig. 9,
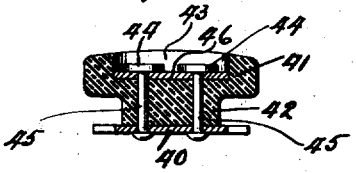
INVENTOR
Carl J. Hazelton
BY
Southgate & Southgate
ATTORNEYS Reissued July 1, 1924. Re. 15,868

UNITED STATES PATENT OFFICE.

CARL J. HAZELTON, OF WORCESTER, MASSACHUSETTS, ASSIGNOR TO AMERICAN NARROW FABRIC COMPANY, OF WORCESTER, MASSACHUSETTS, A CORPORATION OF MASSACHUSETTS.

HOSE SUPPORTER.

Original No. 1,432,693, dated October 17, 1922, Serial No. 538,936, filed February 24, 1922. Application for reissue filed July 2, 1923. Serial No. 649,174.

*To all whom it may concern:*

Be it known that I, CARL J. HAZELTON, a citizen of the United States, and a resident of Worcester, in the county of Worcester and State of Massachusetts, have invented certain new and useful Improvements in Hose Supporters, of which the following is a specification.

This application is a part of a continuation of my application Serial No. 455,764 filed March 26, 1921 and a continuation of my application Serial No. 511,885 filed October 31, 1921.

My invention relates to a hose supporter of the type in which a loop is employed to grip the fabric between it and a button carried by a tab which usually depends from the upper part of the loop. As heretofore constructed these devices have had a serious fault due to the fact that when the hose is gripped the strain on the same is sustained primarily by only a very small number of threads. The result is the frequent production of so-called "runs" which disfigure and weaken the hose. Another defect in hose supporters as now constructed is that the rubber collet forming a part of the supporter is held in place by a headed stud in such a manner that the head of the stud alone is depended upon to hold the collet in place. The result is that any unusual strain on the supporter is likely to dislodge the collet from its supporting element and ruin the whole device.

The present invention is designed to overcome these defects without revolutionizing the appearance of the article.

More specifically stated, the objects of the present invention are to provide a button of such a nature that the clamping grip between the button and the loop will take place along a line extending transversely of the supporter and of a plurality of the threads of the hose so that the strain on the fabric is equally distributed throughout a wide area, a substantial number of threads, wales or stitches being simultaneously gripped and the danger of injury to the hose or "runs" in the hose avoided or very much reduced; to provide a construction in which the rubber collet constituting a part of the button is held firmly in position by two adjacent heads of metal overlying a solid body of rubber constituting part of the collet so that even if the rubber becomes weak through use or age it cannot be pulled off its supporting element; to provide a yielding wall at the lower edge of the button or collet head this wall extending transversely of the button and being engaged by the hose when the supporter is in use to thereby reduce the strain on the hose at this point; to provide these features in such form that the supporter will be effective in cooperation with the loop to hold the hose, no matter at what angle the loop is applied; and to provide effective and inexpensive means for preventing the collet from turning so that the above-mentioned objects will be maintained.

The invention also involves other novel features tending to assist in accomplishing the above-mentioned objects as will appear hereinafter.

In the accompanying drawings Fig. 1 is a front elevation of a hose supporter constructed in accordance with this invention, showing the same in place on a stocking;

Fig. 2 is a similar view showing the hose fabric removed and a part of the supporter loop broken away;

Fig. 3 is a side elevation of the supporter;

Fig. 4 is a section taken substantially on the line 4—4 of Fig. 1;

Fig. 5 is a section taken on the line 5—5 of Fig. 3;

Fig. 6 is a section through the button and base plate of Fig. 3;

Figs. 7 and 8 are plan and sectional elevational views, respectively, of a modified form of button and base plate; and Fig. 9 is a sectional elevational view of a further modified embodiment of my invention.

In Figs. 1, 2 and 3 the hose supporter is illustrated as in a vertical position. The terms "top," "bottom," "front" etc. are therefore employed throughout this specification with this fact in mind, but these and similar terms are used for descriptive purposes only and are to be taken merely as relative and not restrictive.

Referring to the drawings in detail and first of all to Figs. 1 to 6 inclusive,—10 designates a supporter loop of well known construction for receiving the usual elastic strap 11 of the supporter. The loop 10 is pivotally connected with a lower metallic loop 12. This loop is provided with almost parallel but slightly converging side arms 13 the lower ends of which are connected to each other by a straight transverse bar 14. The side arms 13 of the straight transverse bar 14 together provides a substantially rectangular button-receiving loop. These parts are conveniently formed of a single piece of wire or may be a metal stamping.

The loop 10 also supports a strip of textile material 15 which hangs down behind the loop 12 and is usually in the form of non-elastic tape. The lower end of this strip 15 carries a metal base plate 16 provided with the usual transverse perforation 17 for receiving the tape 15. The base plate carries two spaced securing rivets 18. These rivets are provided with heads 19 arranged symmetrically with respect to the shanks of the rivets and of such diameter that they are spaced only a short distance apart.

A rubber covering or collet of a peculiar and novel shape is applied to the shanks of the rivets 18. This collet comprises a shank 21 and a head 22. The shank 21 is preferably of segmental cross section comprising the lower part of a circle and arranged with the flat side or face 23 at the bottom thereof as viewed in Fig. 5. The head 22 of the collet is of generally convex form in elevation and elongated or oval in plan its longitudinal axis being parallel to the flat face of the shank and is provided with an elongated depression or groove 24 extending lengthwise of the head of the collet and parallel with the flat face 23 of the shank. The bottom of the groove 24 serves as a seat for the heads 19 of the securing rivets which are thus sunk well below the surface of the head of the collet. This groove or depression also provides the head of the collet with two walls of rubber 25 and 26 integral with the button or collet and of thin cross-section so as to be readily yieldable toward the center of the button.

When the parts are assembled and in use the straight transverse bar 14 of the button-receiving loop is parallel to the straight bottom transverse surface or face 23 of the collet shank and the groove 24 in the collet head as well as to the yieldable walls 25 and 26.

When the button-receiving loop and the button are brought into cooperative relation with the hose fabric clamped therebetween as shown in Figs. 1 and 4 and a strain is placed upon the hose the straight transverse bar 14 of the loop will firmly clamp the hose fabric against the straight bottom wall provided by the straight bottom surface or face 23 of the shank in a transverse plane thereby clamping or gripping the fabric over a plurality of the wales or lines of stitches of the fabric. The strain on the fabric therefore is widely distributed and there is little danger of the stitches being broken and runs caused as would be the case if the fabric were simply gripped at one or two lines or points. The strain on the fabric is also materially relieved or taken up by the yielding of the bottom wall 25 of the collet head as indicated in Fig. 4, the top or face of this wall as viewed in Fig. 3 or in Fig. 4 being substantially parallel to the plane of the loop when the loop and collet are in operative relative positions. The fabric of the stocking is necessarily somewhat distorted in passing over the head of the button and back through the button-receiving loop but this distortion is minimized by the generally convex shape of the collet head which allows the section of the fabric passing over the button and through the loop to be positioned in a smooth, even form as illustrated in Fig. 1. The two adjacent parallel side arms 13 of the button-receiving loop are spaced at the right distance apart to grip the opposite sides of the convex part of the collet shank as indicated at 27 even when the loop is turned at an angle to its normal position, so that even if the button-receiving loop is initially applied to the hose improperly relatively to the button the hose fabric will still be gripped, and as a strain is put upon the hose the loop due to the curved portion of the shank of the collet will automatically assume its proper cooperative position relative to the collet by rocking or swinging about the button or collet shank.

It will be seen from the description thus far given that in my improved hose supporter the collet shank is provided with a straight extended face or surface 23 against which the fabric of the hose is gripped by the straight transverse bar 14 of the button-receiving loop. It will be seen also that the groove 24 in the collet head extending parallel to the bar 14 of the button-receiving loop provides a lower thin readily yieldable wall 25 of rubber projecting downwardly from said groove as viewed in Fig. 2 to relieve the strain on the hose fabric.

It will be apparent also that not only does the bar 14 of the button-receiving loop grip the hose fabric against the straight face 23 of the button shank but the side arms of this loop are so arranged as to grip the fabric against the straight face 23 of the button shank but the side arms of this loop are so arranged as to grip the fabric against the sides or curved portion of the shank thereby insuring proper clamping or gripping of the hose fabric at all times.

Referring to Figs. 7 and 8, 28 designates a base plate provided with the usual perforations 29. Mounted on this base plate is a rubber collet provided with a head 31 and a shank 32. The shank 32 is similar in shape to the shank shown in Fig. 5 that is to say it is provided with a lower flat portion or face corresponding to the flat portion or face 23 of Fig. 5. The head 31 of the collet is substantially segmental in plan being provided with a flat surface 33 lying in the same plane with the flat surface on the shank and with curved ends 34 and curved upper edge 35. This collet is held on the base plate by a staple comprising a head 36 and spaced legs 37. The head of this staple lies in a depression 38 in the top of the collet head the shape of this depression corresponding to the shape of the head of the staple thereby assisting the spaced legs 37 in preventing the collet from turning. It will be seen that the button head below the depression 38 constitutes a yieldable rubber wall projecting beyond the groove or depression 38 all the way across the button, the lower surface 39 of this wall being substantially continuous with the bottom of the shank inasmuch as the flat surface 33 of the head lies in the plane of the flat surface on the segmental shank. In use, therefore, this portion of the collet head will yield toward the groove in a direction transverse to the long axis of the button.

In Fig. 9 I have provided another embodiment of my invention this form comprising a base plate 40 which may be provided with perforations similar to the perforations 17 of Fig. 5. On this base plate is mounted a rubber collet comprising a head 41 and shank 42. This collet may have a head shaped like the head of the collet of Fig. 2 or the collet of Fig. 7 or may be round if desired. The collet is held to its base plate by a plate 46 and a pair of rivets passing through the plate and collet, these rivets comprising heads 44 and shanks 45. The rivet heads lie in a depression 43 in the collet head provided for that purpose.

Preferably the plate 46 is of the same size and shape as the depression 43 to assist the rivets in preventing the collet from turning.

In all the forms illustrated it will be seen that a solid block of rubber is provided beneath the heads of the rivet or the head of the staple as the case may be this solid block of rubber being an integral part of the collet itself.

Although I have illustrated and described several embodiments of my invention it is to be understood that changes may be made in the details of construction without departing from the spirit and scope of the invention.

I claim:

1. As an article of manufacture a hose supporter comprising a rubber button with a straight bottom wall, a loop having a straight transverse bar at the bottom thereof for gripping the fabric of the hose against said straight wall in a transverse plane, the head of said button being provided with a groove parallel with said bar to provide a lower thin readily yieldable wall of rubber adapted to yield toward the center of the button under excessive strain on the fabric.

2. As an article of manufacture a hose supporter comprising a rubber button having a straight bottom surface or face, a loop having side members to engage the sides of said button and a straight transverse bar to grip the fabric against said straight bottom surface, the head of said button being provided with a groove to provide a lower wall of rubber integral with the button of thin cross-section and located parallel with the straight transverse bar of said loop the top of said lower wall of rubber being substantially parallel with the plane of the loop.

3. A hose supporter comprising a rubber collet provided with a head and a shank, the shank being of segmental form constituting more than half a circle and having a flat side, a metal loop having a substantially rectangular end one side of the rectangular end engaging the flat side of the shank and the two adjacent parallel sides of the metal loop being spaced far enough apart to grip the opposite convex surfaces of the shank even when the loop is at an angle to its normal position.

4. A hose supporter comprising a rubber collet having a head and a shank, said shank having a straight front or bottom surface and being of circular form back of said straight bottom surface, a loop for gripping the hose fabric to said collet said loop having side members to engage the sides of said shank and a straight transverse bar to grip the fabric against the said straight front or bottom surface to keep the fabric in a flat condition all the way across said surface.

5. In a hose supporter the combination of a rubber collet having an oval head and a segmental shank the head of said collet having a groove on its front surface parallel with the straight face of the shank to provide a lower thin wall of rubber readily yieldable toward the groove under excessive strain on the fabric, a base plate and means for securing said collet to the base plate.

6. In a hose supporter the combination of a rubber collet having an oval head and a segmental shank the head of said collet having a groove on its front surface parallel with the straight face of the shank to provide a lower thin wall of rubber readily yieldable toward the groove under excessive strain on the fabric, a base plate and means comprising spaced members passing through the collet for securing said collet to said base plate.

7. In a hose supporter the combination of a rubber collet having an oval head and a segmental shank the head of said collet having a groove on its front surface parallel with the straight face of the shank to provide a lower thin wall of rubber readily yieldable toward the groove under excessive strain on the fabric, a base plate and means comprising two rivets having heads located in said groove for securing the button to the base plate.

8. As an article of manufacture, a supporter clasp comprising a rubber button having a shank and a loop for gripping the fabric thereto, said button having a groove on its front surface, and having a lower straight, thin, readily yieldable wall of rubber projecting beyond said groove all the way across the button, the lower surface of which rubber wall is substantially continuous with the bottom of said shank, whereby under excessive strain on the fabric said wall will yield toward the center of the button.

9. As an article of manufacture, a supporter clasp comprising a rubber button having a straight bottom wall and loop for gripping the fabric thereto, having side members engaging the sides of said button and a straight transverse bar at the bottom gripping the fabric against said bottom wall, said button having a groove parallel with said bar on its front surface and having a straight wall of rubber integral with the button extending in a plane all the way across the front of the button, constituting the lower boundary of said groove, and of thin cross section and located parallel with the holding bar so as to be capable of yielding toward the groove under excessive strain on the fabric, the top of said wall being substantially straight and parallel with the plane of the loop.

This specification signed this 18 day of June, 1923.

CARL J. HAZELTON.